United States Patent [19]
Rahn

[11] Patent Number: 5,782,204
[45] Date of Patent: Jul. 21, 1998

[54] WAVEMAKER FOR LIVING AQUARIUMS

[75] Inventor: Kenneth Rahn, Shirley, N.Y.

[73] Assignee: Tidaltronics Inc., Shirley, N.Y.

[21] Appl. No.: 832,500

[22] Filed: Apr. 3, 1997

[51] Int. Cl.[6] .................... A47K 3/10; A01K 63/100
[52] U.S. Cl. .................... 119/255; 405/79; 4/491
[58] Field of Search .................... 119/255, 245, 119/248, 247, 249, 259; 4/491; 405/79; 417/545, 552

[56] References Cited

U.S. PATENT DOCUMENTS

| | | |
|---|---|---|
| 2,751,880 | 1/1956 | Markowski . |
| 3,292,579 | 12/1966 | Buchanan .................... 119/245 |
| 4,413,436 | 11/1983 | Ward et al. .................... 40/160 |
| 4,467,483 | 8/1984 | Bastenhof .................... 4/491 |
| 4,725,353 | 2/1988 | Whitman .................... 119/259 X |
| 4,728,420 | 3/1988 | Abercia, Jr. .................... 119/259 X |
| 4,817,561 | 4/1989 | Byrne et al. .................... 119/260 |
| 5,226,747 | 7/1993 | Wang et al. .................... 405/79 |
| 5,285,536 | 2/1994 | Long .................... 4/491 |
| 5,535,702 | 7/1996 | Idbeis .................... 119/247 |

FOREIGN PATENT DOCUMENTS

| | | |
|---|---|---|
| 2262423 | 6/1993 | United Kingdom .................... 119/255 |

OTHER PUBLICATIONS

*Freshwater and Marine Aquarium* Magazine, vol. 20, No. 1, published by Don Dewey, 6 pages, Jan. 1997.

Primary Examiner—John J. Wilson
Assistant Examiner—Yvonne R. Abbott
Attorney, Agent, or Firm—Alfred M. Walker

[57] ABSTRACT

The present invention relates to aquariums or reef tanks and especially those in which living corals reside. Besides providing a pleasing visual effect, alternating currents within the aquarium are beneficial to the proper health of living corals. Pressurized water from a pump or powerhead is directed by a shuttle valve to one of two outlets. A rod is attached to a plunger through a seal. The rod moves axially by the influence of the pump or powerhead. In operation, a moving seal shuttles back and forth, alternately sealing one of a pair of valve bodies. When moved, the plunger with the attached rod is pulled in, thereby blocking flow to one valve body, while opening flow through the other valve body. By alternately moving the perspective plungers, flow of water within the aquarium tank is alternately diverted from one valve body to the other, providing the desired wave motion in the aquarium tank.

7 Claims, 5 Drawing Sheets

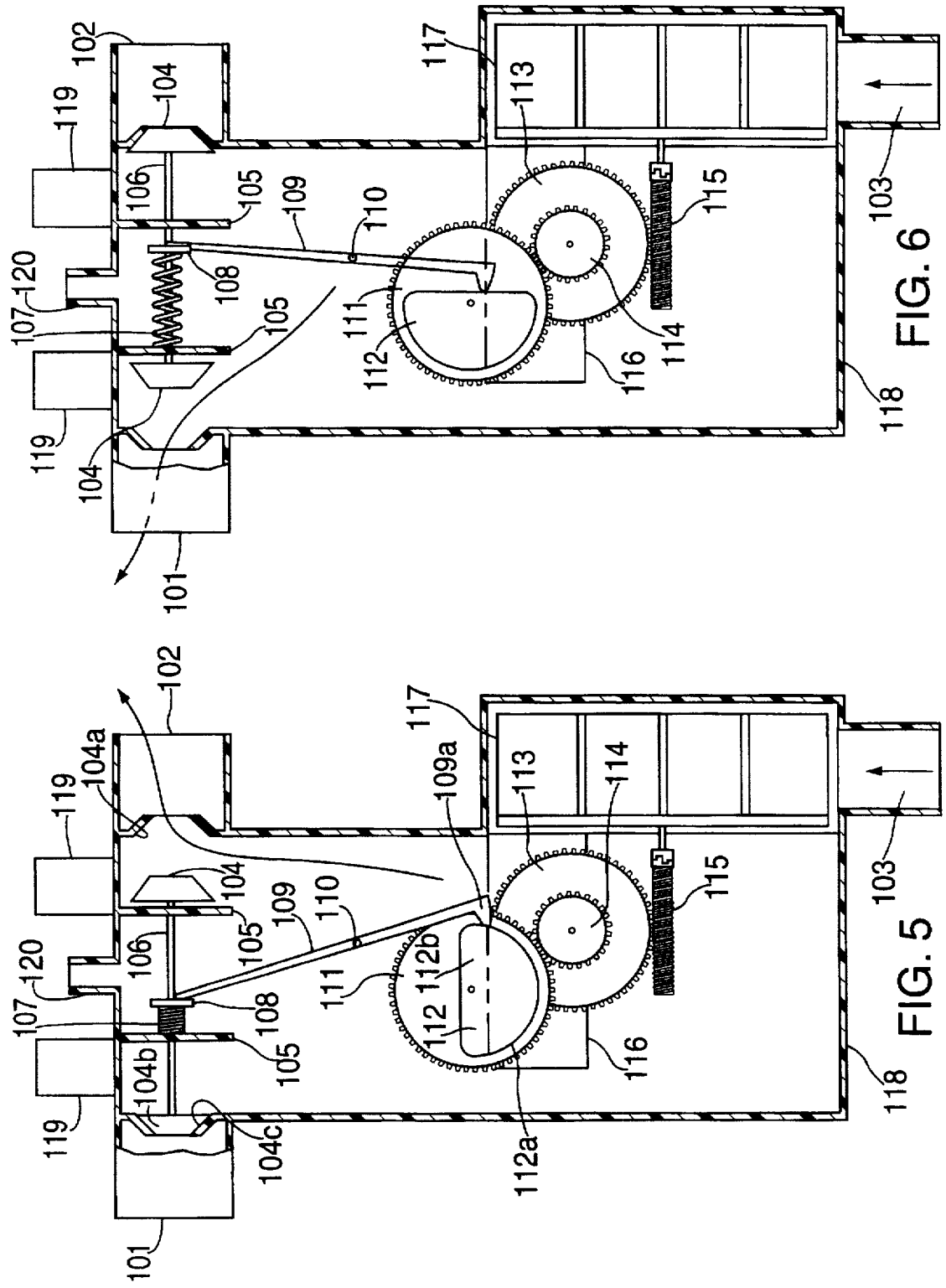

5,782,204

WAVEMAKER FOR LIVING AQUARIUMS

FIELD OF THE INVENTION

The present invention relates to aquariums or reef tanks and especially those in which living corals reside. Besides providing a pleasing visual effect, alternating currents within the aquarium are beneficial to the proper health of living corals.

BACKGROUND OF THE INVENTION

Aquarium wave makers are not unknown. In fact several models are available from accessory manufacturers as advertised in the Jan. 1997 issue of *Freshwater and Marine Aquarium* magazine (Volume 20 number 1, published by Don Dewey). On page 45 of this issue, the TSUNAMI wave maker from Blue Line Products is described with the ability to control three independent powerheads. On page 90, there is described the PULSE-IT controller from Filtronics, which can be used to pulse one or two pumps or powerheads. On page 126, a Pet World, Inc. ad describes the WAVEMAKER series of microprocessor controllers which provide a "soft start" to protect the user's powerheads. In the same issue, an ad from Pet Warehouse announces a $125 sale for an OCEAN MOTION microprocessor wavemaker that can control up to four wavemaking pumps simultaneously. The cost for powerhead pumps Starts at $15 for low flow and goes up to $30 or more.

Some patent prior art also relates to this invention. U.S. Pat. No. 4,467,483 of Bastenhof discloses a Pneumatic Wave Generator for a surf pool using wave generating chambers, large air compressors and coupled inlet and outlet valves. U.S. Pat. No. 2,751,880 of Markowski describes animated display aquariums which incorporate a pump to induce a steady flow through a continuous circuit of water placed inside of an aquarium. U.S. Pat. No. 4,413,436 of Ward et al. describes a scenic display within an aquarium with simulated stream flow. Ward 436 uses a stream operated paddle to oscillate a baffle, which alters the current flow periodically in a simulated lake.

U.S. Pat. No. 4,817,561 of Byrne et al. describes an electrically powered aquatic aeration and filtering system for an aquarium with a bottom filter bed.

The main shortcoming of the aquarium wavemaking apparatus that can be currently purchased is high cost. The first cost is high because they require multiple powerheads or pumps along with timer controls to achieve real wave action. Cycling of powerheads on and off causes premature failure, which can be somewhat mitigated by an expensive "soft start" apparatus. Furthermore, multiple powerheads take up space, are noisy, and consume more power.

Clearly, the pneumatic wave generator of Bastenhof 483 is only appropriate at the very large scale for which it was designed. Markowski 880 is a steady flow device that does not produce waves. While Ward 436 does modulate the flow in a simulated lake, the mechanism employed does not have the ability to reverse flow periodically in true wave motion. Byrne 561 creates a steady current, not wave motion.

OBJECT OF THE INVENTION

It is therefore an object of the present invention to create simulated waves in an aquarium using a single continuously operating powerhead through, the use of a shuttle valve and timer control.

A further object of this invention is to produce a flow driven timer control to operate the shuttle valve.

Another object of the present invention is to operate the shuttle valve by an AC gear motor timer drive.

Yet another object of this invention is to use an electronic timer to operate the shuttle valve through a solenoid.

Still another object of the invention is to use a small steady flow through a manifold to impinge upon the water surface to entrain air to aerate the water.

SUMMARY OF THE INVENTION

In keeping with these objects and others which may become apparent, the present invention includes an aquarium wavemaker for making pulsed water-flow waves reciprocally in differing directions within the aquarium. The aquarium wavemaker includes a pump for pressured circulation of aquarium water, and a plurality of water outlets for directing outlet water in differing directions within the aquarium. A plurality of water outflow valves are matched to the respective water outlets to control the pressured circulation of aquarium water. During use, a reciprocating piston controls the water outflow valves reciprocally by opening one of the outflow valves while closing all the others. The reciprocating piston is moved by a force applicator, which forces reciprocal motion of the reciprocating piston.

Preferably, the plurality of water outlets which direct outlet water in differing directions, may include a pair of outlets, which are spaced apart from the aquarium wavemaker and are connected to it by a water conduit. In this embodiment, the pair of spaced apart outlets are positioned to direct an aquarium water outflow in directions substantially opposite to one another.

The plurality of water outflow valves are matched to the respective water outlets and are part of a shuttle valve having preferably a pair of said reciprocating water outflow valves, one for each water outlet. Each water flow valve forms a respective valve seat, and a pair of reciprocating elastomeric plungers are attached to the piston, which provides reciprocal motion of each plunger into and out of each valve seat to alternately close and open each water outflow valve of the shuttle valve to the flow of water therethrough.

The piston which provides reciprocal plunger motion has two ends and is attached at its respective ends to the respective plungers of the pair of water flow valves. This provides the reciprocal seating of one valve plunger and the unseating of the other to thereby alternately and reciprocally open and close the pair of valves.

Furthermore, the piston is provided with a spring to urge the piston to one of the extremes of its reciprocal motion. In a preferred embodiment, the spring is a coil spring co-axially mounted upon the piston.

In one embodiment of the present invention, the force applicator which forces reciprocal motion of the reciprocating piston, against the urging of the spring, includes an elongated pivot arm having two ends and a center. The pivot arm has a pivot attached at its center, and the pivot arm includes a reciprocal motion forcing means at the end thereof, opposite to the end attached to the reciprocating piston. In addition, the pivot arm is attached at one end to the reciprocating piston.

In a further embodiment, the pivot arm reciprocal motion forcing means includes a paddle wheel and gear and cam arrangement. The energy for turning the paddle wheel is supplied by pressured flow of circulating aquarium water. The paddle wheel is also in a gear-driving attachment by a direct shaft therefrom, to a worm gear, which in turn is in driving attachment to at least one toothed cog wheel gear.

3

Each cog wheel gear has a cam mounted thereon. The cam is preferably a semi-circular raised surface upon the cog wheel gear. The cam has a radial portion in concentric disposition to the cog wheel gear and a flat portion substantially parallel to the radius line of the cog wheel gear. The cam contacts a cam follower mounted upon the pivot arm, and the cam follower forcibly moves the pivot arm in relation to its travel along the cam, which rotates with and projects from the one cog wheel gear.

The wavemaker may alternately be powered by a solenoid in a dry housing sealed off from the aquarium water. The solenoid is supplied by an electrical energy source, which is external to the wavemaker. The solenoid is connected to and forcibly moves the piston in a reciprocal motion. The piston has two ends and a central portion, wherein one end of the piston is attached through the sealed dry housing to the solenoid.

In this embodiment, the wavemaker has a central intake water chamber and a pair of flow division chambers. Each flow division chamber includes a water admission aperture to admit the flow of water from the central intake chamber. Furthermore, the flow division chambers are in respective water flow connection to the pair of water outlets.

The central intake chamber in turn is connected in a water flow connection to the pair of flow division chambers.

The water admission apertures of the pair of flow division chambers are spaced apart and are in a linear arrangement with the piston, which extends longitudinally through each respective aperture and the central intake water chamber.

Fixed to a central portion of the piston is an elastomeric water seal, which seals one of the flow division chamber water Admission apertures at a time when the seal is alternately and reciprocally engaged to the piston by the solenoid-driven reciprocal motion of the piston, which thereby alternately and reciprocally opens and closes the pair of aquarium water outlets. As a result, a continuous alternating wave motion is created without the need for separate pumps or motors.

BRIEF DESCRIPTION OF THE DRAWINGS

The present invention can best be understood in connection with the accompanying drawings, in which:

FIG. 5 is a rear internal view of a flow operated valve of the wavemaker apparatus, with the right outlet open, wherein the housing is shown in cross section;

FIG. 6 is a rear internal view of the flow operated valve of the wavemaker apparatus, with the left outlet open, wherein the housing is shown in cross section;

4

DETAILED DESCRIPTION OF THE DRAWINGS

Figure 1:
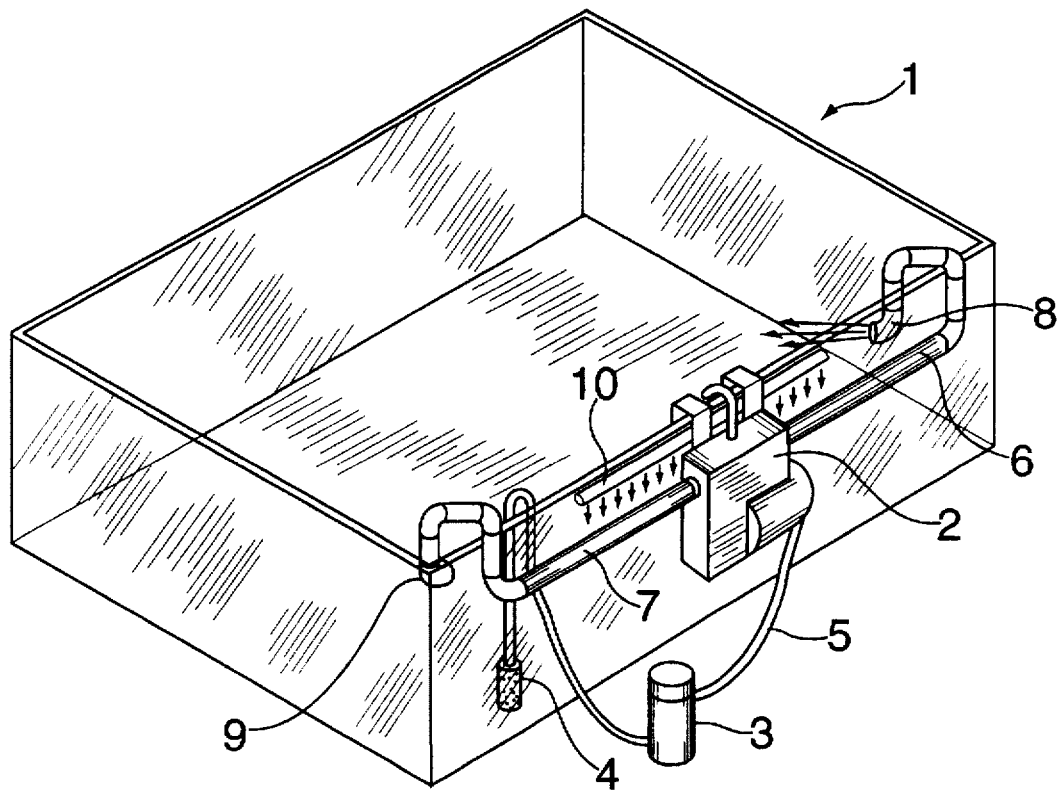
FIG. 1 is an isometric view of the wave making apparatus mounted on an aquarium.

FIG. 1 shows shuttle assembly valve 2 of the wavemaker apparatus of the present invention mounted on aquarium tank 1. Water inlet 4 near the bottom of aquarium tank 1 leads to canister filter 3, with a powerhead, which feeds pressurized water via hose 5 to shuttle valve 2. A small amount of steady flow is directed to manifold 10, while the major flow is alternately directed to first outlet 8 via outlet pipe 6 or to a second outlet 9 via outlet pipe 7 by shuttle valve assembly 2.

Figure 2:
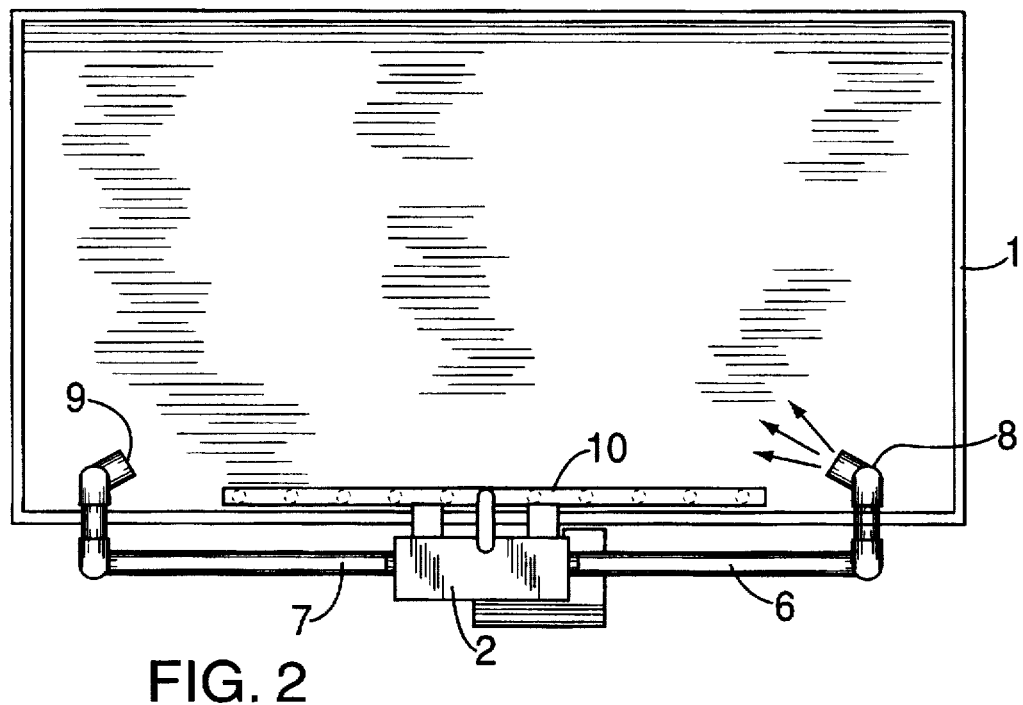
FIG. 2 is a top plan view showing the wavemaker apparatus in place on the aquarium.

FIG. 2 is a top plan view of the wavemaker apparatus as in FIG. 1.

Figure 3:
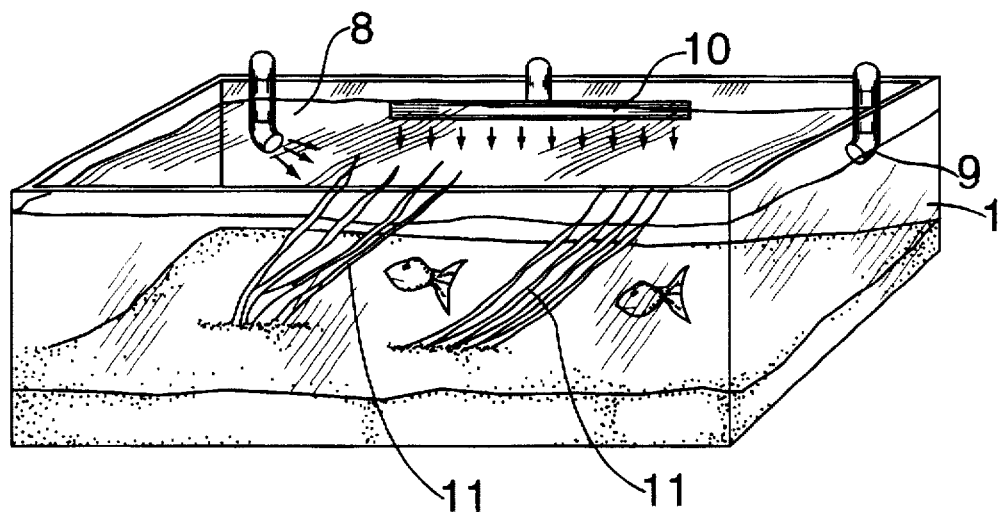
FIG. 3 is an isometric view of the operation of the left outlet of the wavemaker apparatus.

FIG. 3 shows a populated tank with flow emanating from outlet 8 on the left towards coral foliage 11, which is swayed to the right by the flow of water from outlet 8.

Figure 4:
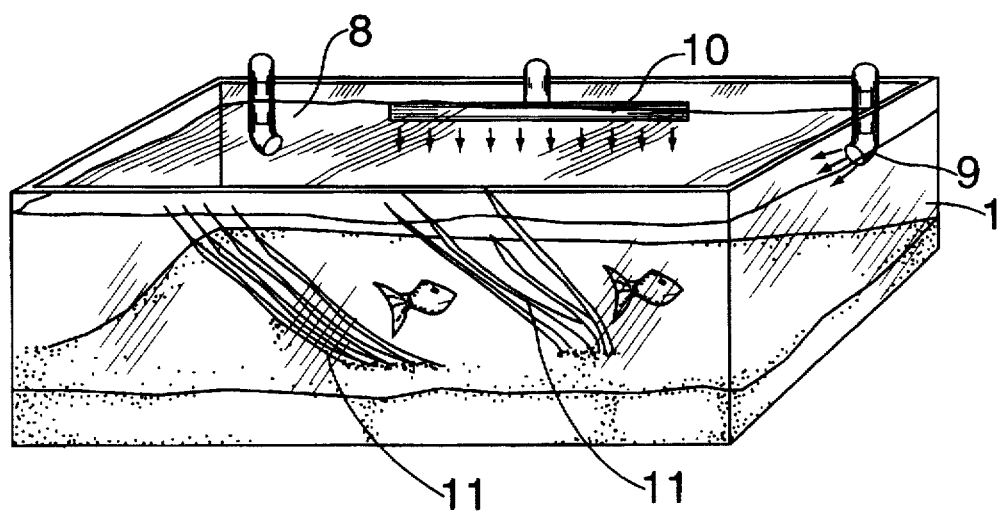
FIG. 4 is an isometric view of the operation of the right outlet thereof.

FIG. 4 shows the same conditions with the major flow emanating from outlet 9 on the right, which causes coral foliage 11 to now sway to the left. The downward arrows emanating from manifold 10 represent the steady flow of water to aquarium tank 1 in general. If manifold 10 is placed so that the flow is about one inch (about 2.5 cm.) above the surface of the water, the impingement of the streams upon the water surface will entrain sufficient air to aerate the water with the desired amount of dissolved oxygen, if the flow is high velocity. In this way, a single powerhead is used to provide wave motion, filter the water and also provide aeration for a minimum cost installation.

Alternatively, as shown in FIGS. 3 and 4, manifold 10 can be placed below the surface of the water, in which case the flow will be quieter, but an alternate means, such as a separate air pump, will be required to aerate the aquarium water. Thus a continuously operating pump or powerhead, as with filter 3, is used with shuttle valve 2, which periodically shifts the flow of if water within aquarium 1, alternating the current inside aquarium tank 1 just like the natural surf.

FIG. 5 shows the internal mechanism of one embodiment for a flow operated shuttle valve, wherein shuttle valve housing 118 is shown in cross section.

Water inlet 103 from the pump or powerhead of filter 3 drives paddle wheel 117 which is attached at its center to worm gear 115. Worm gear 115, in turn, drives a speed reducing gear train including gears 113, 114 and 111, which gear 111 then rotates cam 112 at a slow speed. A small percentage of the flow of water is diverted to outlet 120 which eventually emanates from 25 manifold 10. The major flow of water in FIG. 5 is out through outlet 102 on the right, since sealing plunger 104 on the right end of plunger rod 106 is shown spaced away from the valve seat 104a on the right.

Sealing plunger 104b on the left end of rod 106 is seated in 30 the valve seat 104c, thus sealing outlet 101. Collar 108, attached to rod 106, is pushed left by the top end of pivot arm 109 pivoting on pivot 110, thereby compressing spring 107. This action is dictated by the position of the cam follower 109a at the distal end of pivot arm 109, resting on circular portion 112a of cam 112, which cam 112 also includes linear portion 112b. As cam 112 rotates further clockwise, flat portion 112b of cam 112 contacts cam follower 109a thereby shifting shuttle valve 2 to its opposite position by the action of spring 107 on collar 108.

This is shown in FIG. 6 where the major flow of water is now shifted to outlet 101 on the left, while outlet 102 is sealed by plunger 104 at the right end of rod 106.

Figure 7:
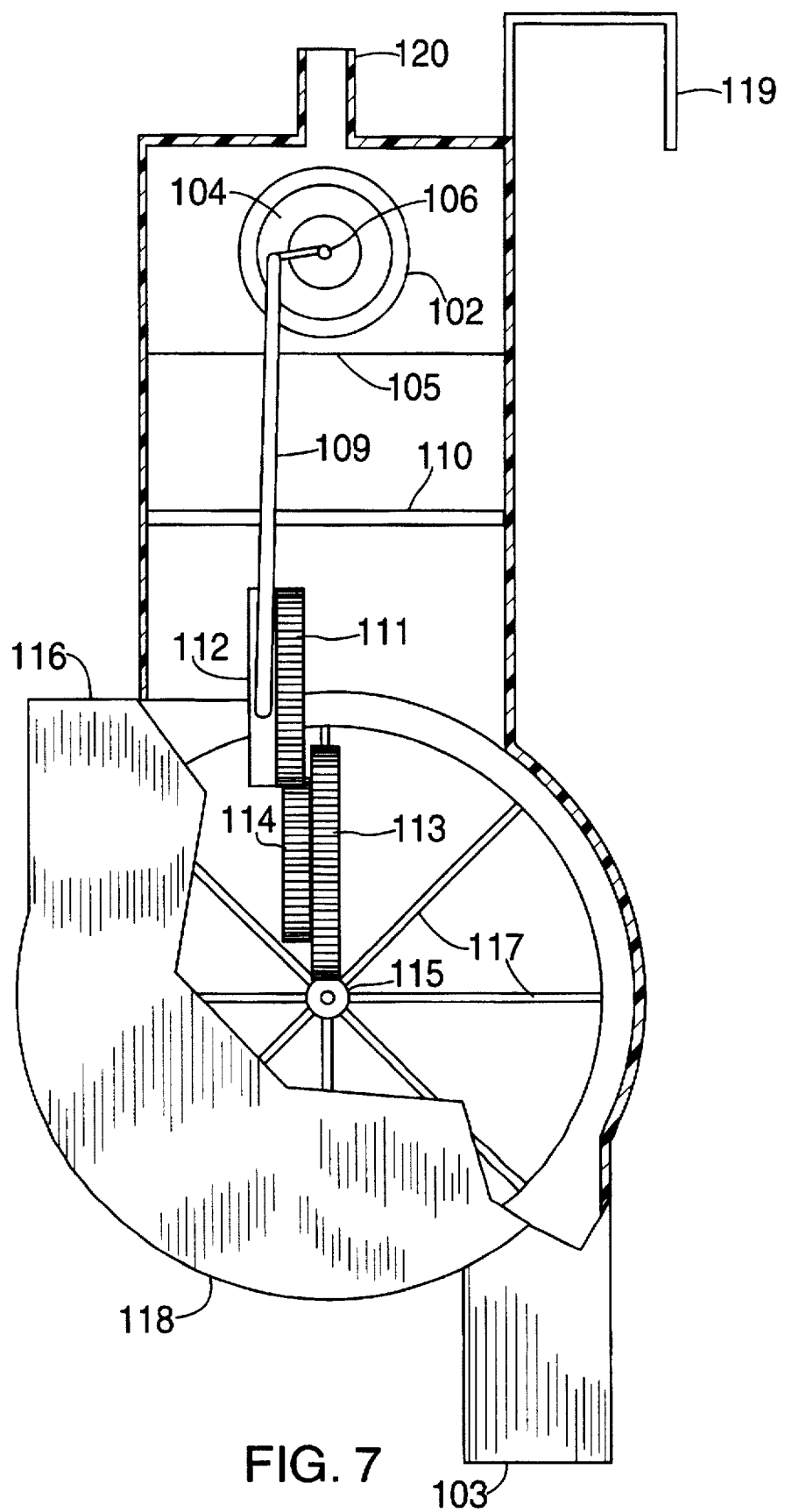
FIG. 7 is an internal side view of the flow operated valve of the wavemaker apparatus, wherein the housing is shown in cross section.

FIG. 7 is a side view showing paddle wheel 117 as it relates to the gear train including gears 111, 113 and 114, as well as the form of paddle turbine housing 116 as well.

Furthermore, tank hooks 119 support the aquarium apparatus over the top edge of aquarium tank 1.

Figure 8:
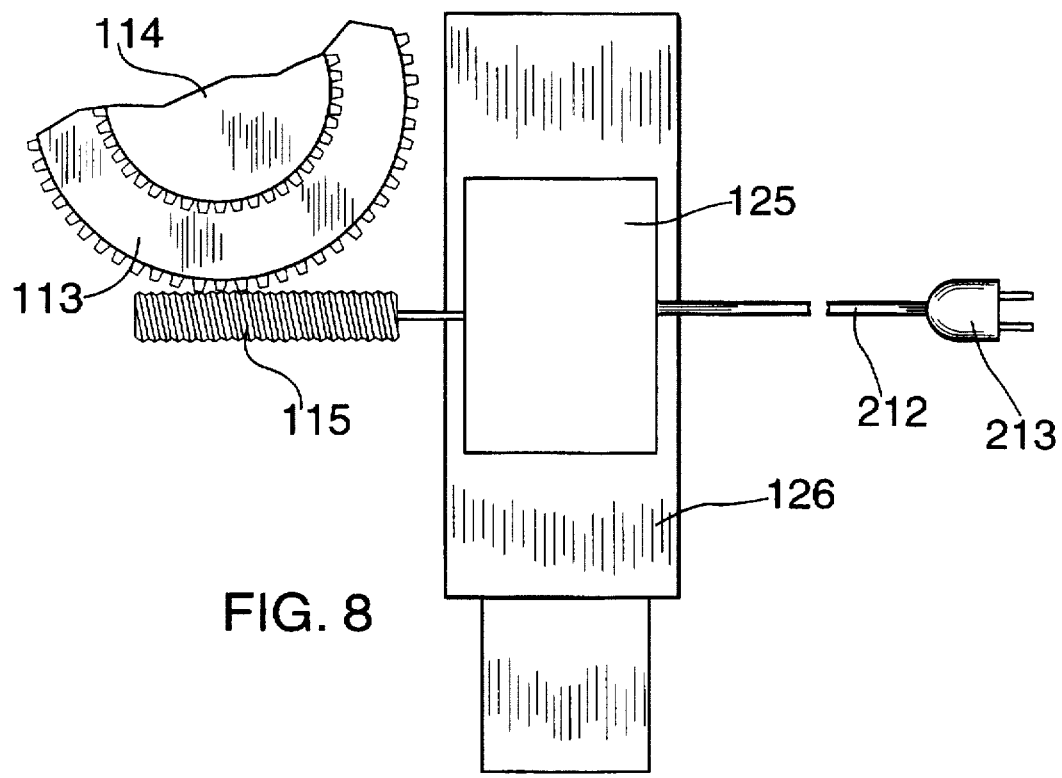
FIG. 8 is a rear detail view of the valve thereof, operated by a motor timer; and, FIG. 9 is a rear internal view of an alternate embodiment for a solenoid operated valve, wherein the housing is shown in cross section.

FIG. 8 shows an alternate embodiment where a low RPM AC gear motor 125 is substituted for the flow driven turbine paddle wheel 117. Gear motor 125 drives worm gear 115 through a seal in the housing (not shown) which provides a dry housing 126 for gear motor 125. Gear motor 125 is supplied with electrical power from power cord 212 and wall plug 213.

Figure 9:
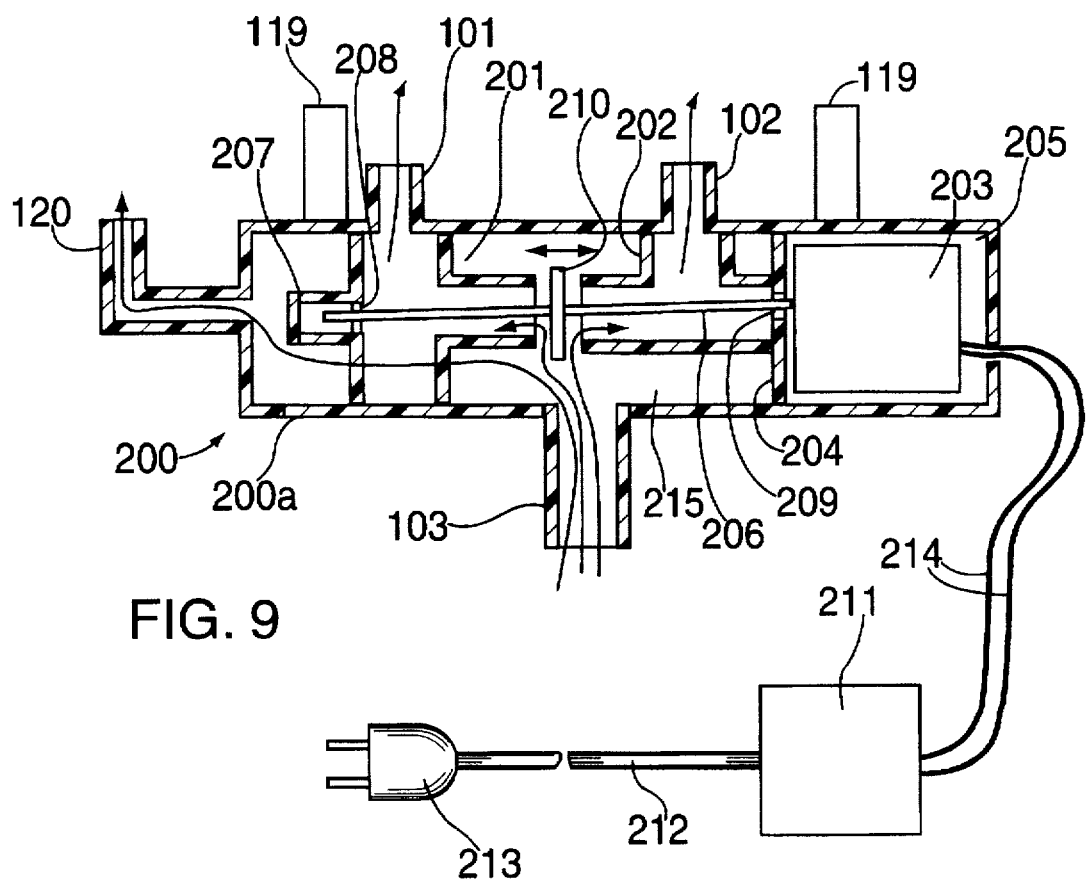

FIG. 9 is an internal view of the solenoid-driven shuttle valve 200 of the preferred embodiment. Solenoid valve 200 includes housing 200a and internal channels therein are shown in cross section. Pressurized water from a pump or powerhead, such as, for example, filter (not shown), similar to filter 3 of FIG. 1, enters inlet 103 and fills and circulates through interior 215 of valve housing 200a around internal hollow structures 201 and 202, preferably T-shaped, and through outlet 120, which permits a low steady flow of water which exits at a manifold (not shown in FIG. 9), such as manifold 10 of FIG. 1. Dry chamber 205 is formed at one end of valve housing 200a to enclose solenoid 203, which solenoid 203 operates a shuttle mechanism including axially movable rod 206 and elastomeric seal 210 bonded to rod 206. The proximal end of rod 206 is attached to the plunger of solenoid 203 through seal 209 in sealed wall 204 which separates dry chamber 205 from wet chamber 215.

Alternatively, sliding seal 209 can be replaced with an elastomeric diaphragm which is bonded to rod 206 at its center and bonded to wall 204 at its periphery. This arrangement also seals chamber 205 from fluid in interior 215 of valve housing 200a, while permitting axial motion of rod 206 by the urging influence of solenoid 203.

The distal end of rod 206 rides in linear bearing 208, enclosed by hollow extension member 207.

In operation, moving seal 210 shuttles back and forth, alternately sealing against the open face of hollow internal structure 201 on the left, or the open face of hollow internal structure 202 on the right.

When solenoid 203 is unenergized, an internal bias spring therein (not shown) pushes the plunger out, thereby forcing seal 210 against the open face of hollow structure 201, preventing flow of water out of outlet 101. The same action opens the pathway through the face of 202 to outlet 102.

When solenoid 203 is energized, the plunger with attached rod 206 is pulled in, thereby sealing off hollow structure 202, blocking flow to outlet 102 while opening flow through hollow structure 201 and then through outlet 101. Thus by alternately energizing and unenergizing solenoid 203, water flow in aquarium tank 1 is alternately diverted from outlet 101 to outlet 102, providing the desired wave motion in aquarium tank 1.

Wall plug 213 and cable 212 power the electronic power supply and timer 211. This provides appropriate low voltage power through wires 214 in 50% duty cycle pulses at the desired wave rate. Timer 211 may be fixed or adjustable. The low voltage may be AC or DC depending on the type of solenoid used, such as 24 volts AC at 0.7 amps. For example, timer 211 may supply 24 volt AC power pulses of five seconds duration every 10 seconds. The current in the tank 1 then shifts direction every five seconds.

It is therefore know that the above embodiments are illustrative of the present invention, which may include further alternate embodiments within the scope of the present invention, as noted in the appended claims.

I claim:

1. An aquarium wavemaker for making pulsed water-flow waves reciprocally in differing directions within the aquarium, comprising:

a. pump means for pressured circulation of aquarium water;

b. a plurality of water outlet means for directing outlet water in differing directions within the aquarium;

c. a plurality of water outflow valves matched to said respective water outlet means for controlling pressured circulation of aquarium water;

d. reciprocating piston means for controlling said water outflow valves reciprocally so as to open one outflow valve while closing all others; and e. force application means for forcing reciprocal motion of said reciprocating piston means.

2. The apparatus of claim 1, wherein a. said plurality of water outlet means for directing outlet water in differing directions comprises a pair of outlets spaced apart from the aquarium wavemaker and connected to it by water conduit means; and wherein further b. said pair of spaced apart outlets are positioned to direct an aquarium water outflow in directions substantially opposite to one another; and c. said plurality of water outflow valves matched to said respective water outlet means comprises a shuttle valve having a pair of reciprocating valves, one for each water outlet, said water outlet valves each comprising a valve seat, said shuttle valve further including a reciprocating piston and an elastomeric plunger attached to each end of said piston, said piston for providing reciprocal motion of each said plunger into and out of each said respective valve seat for respective closing and opening of each said water outlet valve to said flow of water therethrough.

3. The apparatus of claim 2, further comprising a solenoid in a dry housing sealed off from the aquarium water, said solenoid supplied by electrical energy external to the wavemaker, said solenoid comprising motion forcing means and being in connection with said piston for providing reciprocal motion, said piston having two ends and a central portion, one end of said piston being attached through said sealed dry housing to said solenoid, and wherein further:

the wavemaker has a central intake water chamber and a pair of flow division chambers having water admission apertures for admitting flow water from said central intake chamber, said flow division chambers being in respective water flow connection to said pair of water outlets, said central intake chamber being in turn in water flow connection to said pair of flow division chambers, said pair of flow division chambers having water admission apertures being in spaced apart linear arrangement with said piston, which said piston extends through each respective aperture and said central intake water chamber; and said piston further having fixedly mounted upon its central portion an elastomeric water seal capable of sealing one of said flow division chamber water admission apertures at a time when alternately and reciprocally emplaced thereupon by a solenoid driven reciprocal motion of said piston so as to thereby alternately and reciprocally open and close said pair of aquarium water outlets.

4. The device of claim 2, wherein said piston for providing reciprocal plunger motion has two ends and is attached at its respective ends to said respective plungers of said pair of valves, to provide the reciprocal seating of one valve plunger and the unseating of the other to thereby alternately and reciprocally open and close said pair of valves; and wherein further, said piston is provided with spring means for urging said piston to one of the extremes of its reciprocal motion.

5. The device of claim 4 wherein said piston spring means is a coil spring co-axially mounted upon said piston.

6. The device of claim 4 further wherein;

said force application means for forcing reciprocal motion of said reciprocating piston means against the urging of said spring means comprises an elongated pivot arm having two ends and a center, said pivot arm having a pivot attached at its center, said pivot arm having reciprocal motion forcing means at an end thereof opposite to an end thereof attached to said reciprocating piston; and said pivot arm being attached at one end to said reciprocating piston.

7. The device of claim 6 further where said pivot arm reciprocal motion forcing means comprises a paddle wheel and gear and cam arrangement, the energy for turning said paddle wheel being supplied by pressured flow of circulating aquarium water, said paddle wheel being further in gear-driving attachment by direct shaft therefrom to a worm gear which in turn is in driving attachment to at least one toothed cog wheel gear, and wherein;

said at least one cog wheel gear has a cam mounted thereon, said cam being a semi-circular raised surface upon said at least one cog wheel gear, said cam having a radial portion in concentric disposition to said cog wheel gear and a flat portion substantially parallel to the radius line of said cog wheel gear, said cam for contacting a cam follower mounted upon said pivot arm, said cam follower providing forced motion to said pivot arm in relation to its travel along said cam rotating with and projecting from said at least one cog wheel gear.

* * * * *